United States Patent
Zheng et al.

(10) Patent No.: US 8,422,753 B2
(45) Date of Patent: Apr. 16, 2013

(54) METHOD AND SYSTEM FOR AUTOMATIC EXTRACTION OF PERSONALIZED LEFT ATRIUM MODELS

(75) Inventors: Yefeng Zheng, Dayton, NJ (US); David Liu, Princeton, NJ (US); Jan Boese, Eckental (DE); Dorin Comaniciu, Princeton Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 297 days.

(21) Appl. No.: 12/901,600

(22) Filed: Oct. 11, 2010

(65) Prior Publication Data

US 2011/0096964 A1   Apr. 28, 2011

Related U.S. Application Data

(60) Provisional application No. 61/253,894, filed on Oct. 22, 2009.

(51) Int. Cl.
*G06K 9/00* (2006.01)
*G06K 9/34* (2006.01)

(52) U.S. Cl.
USPC ............ 382/128; 382/154; 382/173

(58) Field of Classification Search .......... 382/128, 382/154, 173
See application file for complete search history.

(56) References Cited

U.S. PATENT DOCUMENTS

| | | | |
|---|---|---|---|
| 6,743,225 B2 | 6/2004 | Sanchez et al. | |
| 6,926,714 B1 | 8/2005 | Sra | |
| 7,565,190 B2 * | 7/2009 | Okerlund et al. | 600/426 |
| 7,747,047 B2 * | 6/2010 | Okerlund et al. | 382/128 |
| 7,957,572 B2 * | 6/2011 | Von Berg et al. | 382/128 |
| 2005/0197568 A1 * | 9/2005 | Vass et al. | 600/426 |
| 2006/0009755 A1 | 1/2006 | Sra | |
| 2007/0043296 A1 | 2/2007 | Schwartz | |
| 2008/0101676 A1 * | 5/2008 | Zheng et al. | 382/131 |
| 2009/0010516 A1 * | 1/2009 | Boese et al. | 382/131 |

OTHER PUBLICATIONS

Yefeng Zheng; Barbu, A.; Georgescu, B.; Scheuering, M.; Comaniciu, D.;, "Fast Automatic Heart Chamber Segmentation from 3D CT Data Using Marginal Space Learning and Steerable Features," Computer Vision, 2007. ICCV 2007. IEEE 11th International Conference on , vol., No., pp. 1-8, Oct. 14-21, 2007.*

* cited by examiner

*Primary Examiner* — Bhavesh Mehta
*Assistant Examiner* — Utpal Shah

(57) ABSTRACT

A method and system for automatic extraction of personalized left atrium models is disclosed. A left atrium chamber body is segmented from a 3D image volume. At least one pulmonary venous ostium is detected on the segmented left atrium chamber body. At least one pulmonary vein trunk connected to the left atrium chamber body is segmented based on the detected pulmonary venous ostia.

27 Claims, 18 Drawing Sheets

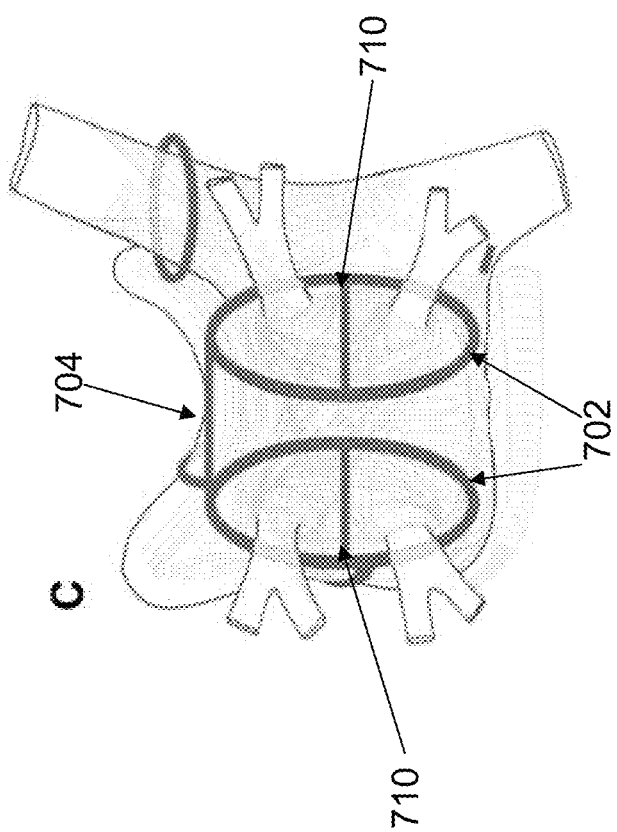

METHOD AND SYSTEM FOR AUTOMATIC EXTRACTION OF PERSONALIZED LEFT ATRIUM MODELS

This application claims the benefit of U.S. Provisional Application No. 61/253,894, filed Oct. 22, 2009, the disclosure of which is incorporated herein by reference.

BACKGROUND OF THE INVENTION

The present invention relates to x-ray imaging, and more particularly, to automatic left atrium segmentation within medical images of the heart.

According to the American Heart Association, 15% of all strokes (the second ranking cause of death worldwide) are caused by atrial fibrillation (AF). AF is a disease related to the left atrium (LA) which is responsible for pumping oxygenated blood to the left ventricle. During AF, the LA quivers in an abnormal rhythm which results in blood failing to pump out effectively. As a result, the blood residing in the LA is likely to form clots. The clots block the passage of blood flowing into smaller blood vessels, which causes strokes.

Radio-frequency catheter ablation is a widely used minimally invasive approach to treat AF. This particular ablation procedure uses high radio-frequency energy to eliminate sources of ectopic foci, which are abnormal pacemaker sites within the heart. Segmentation of the LA is extremely important in pre-operative assessments to identify potential sources of abnormal electrical events related to ectopic foci. Recent research has found that pulmonary venous drainages are also a primary cause of ectopic foci. Thus, it is important that the LA chamber body and pulmonary venous drainages of patients be detected accurately to facilitate a proper ablation strategy for treating AF.

Large variations in drainage patterns exist within any given population. Approximately 71% of the world population possesses two ostia on the right side of the heart allowing blood passage for the upper and lower lobe veins. The remaining approximately 29% of the world population possess anywhere from three to five ostia on the right side of the heart. In rare cases, a person may only have a single right venous ostium.

Variations in the left side of the heart are smaller, since approximately 86% of the population has two separate ostia for the upper and lower lobe veins. Identification of the drainage pattern and extraction of a personalized LA model would be helpful in creating user-defined ablation strategies (e.g., circumferential segmented ablation) tailored for specific patient anatomies.

Accordingly, an automated method for extraction of a personalized LA model and pulmonary vein model for supporting personalized ablation strategies is desirable.

BRIEF SUMMARY OF THE INVENTION

The present invention provides a method and system for automatic extraction of personalized left atrium models. A left atrium chamber body is segmented from a 3D image volume. At least one pulmonary venous ostium is detected on the segmented left atrium chamber body. At least one pulmonary vein trunk connected to the left atrium chamber body is segmented based on the detected pulmonary venous ostia.

In an embodiment of the present invention, the personalized left atrium model is generated by fitting the segmented at least one pulmonary vein trunk to the segmented left atrium chamber body.

The left atrium chamber body is segmented by localizing the left atrium chamber body in the 3D volume using marginal space learning (MSL), and deforming a boundary of the left atrium chamber body using a learning based boundary detector.

The left atrium chamber body is localized by estimating position candidates for the left atrium chamber body using a trained position detector, estimating position-orientation candidates for the left atrium chamber body based on the estimated position candidates using a trained position-orientation detector, estimating a full similarity transform of the left atrium chamber body based on the estimated position-orientation candidates using a trained position-orientation-scale detector, and determining an initial shape of the left atrium chamber body using the estimated full similarity transform.

The boundary of the left atrium chamber may be deformed by deforming the boundary of the localized left atrium chamber body using the learning based boundary detector and an active shape model.

The at least one pulmonary venous ostium may be detected by generating probability maps of pulmonary venous ostia in the 3D image volume at a plurality of resolutions using a plurality of trained detectors, determining a configuration of the pulmonary venous ostia based on the probability maps, and mapping the configuration of the pulmonary venous ostia to a set of major pulmonary drainage patterns.

The at least one pulmonary vein trunk may be segmented by determining a center line of the at least one pulmonary vein trunk from the detected at least one pulmonary ostium on the left atrium chamber body, defining a radius of the at least one pulmonary vein trunk, and refining a boundary of the at least one pulmonary vein trunk.

The boundary of the at least one pulmonary vein trunk may be refined by adjusting mesh points on the at least one pulmonary vein trunk based on a learning based boundary detector, and smoothing the mesh points.

In an embodiment of the present invention, an ablation strategy may be automatically generated based upon the extracted personalized left atrium model.

These and other advantages of the invention will be apparent to those of ordinary skill in the art by reference to the following detailed description and the accompanying drawings.

BRIEF DESCRIPTION OF THE DRAWINGS

FIGS. 7a-7d illustrate common ablation strategies;

DETAILED DESCRIPTION

The present invention is directed to a method and system facilitating automatic extraction of a personalized left atrium (LA) model using 3D medical images, including, but not limited to, DynaCT images, cardiac CT images, and cardiac magnetic resonance imaging (MRI) images. Embodiments of the present invention are described herein to give a visual understanding of personalized LA model extraction. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within and by a computer system using data stored within the computer system.

Figure 1:
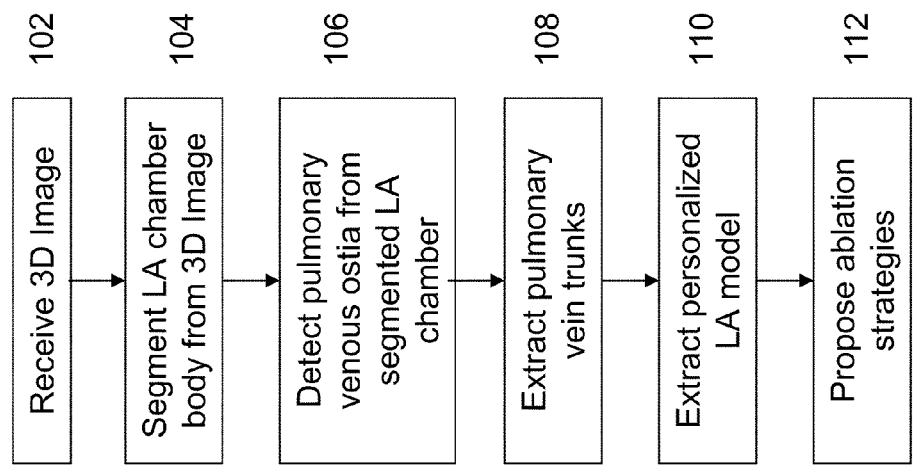
FIG. 1 illustrates a method for automatic extraction of a personalized left atrium model according to an embodiment of the present invention.

FIG. 1 illustrates a method for automatic extraction of a personalized LA model according to the embodiments of the present invention. The method of FIG. 1 transforms medical image data representing a cardiac region of a patient to detect and visualize various anatomical features of the patient in order to extract a personalized LA model. The LA chamber body is segmented using marginal space learning (MSL). MSL may be used to detect the position, orientation, and scales of a shape. MSL is described in further detail in United States Patent Application No. 2008/0101676 entitled "System and Method for Segmenting Chambers of a Heart in a Three Dimensional Image", which is incorporated herein by reference.

The pulmonary venous ostia are then detected on the chamber surface of the segmented LA chamber body using a robust multi-resolution probability map based coarse-to-fine approach. The pulmonary vein trunk may be traced based on the detected ostia to facilitate further segmentation of the vessel lumen. The extracted patient specific LA model can be used for pre-operative assessment of the LA anatomy and may be overlaid onto 2D fluoroscopic images during surgery to provide visual guidance to physicians.

Referring to FIG. 1, at step 102, a 3D image of a patient's heart is received. According to an embodiment of the present invention, the 3D image can be a CT image, DynaCT image, MRI image, or an image generated using any other medical imaging modality. The 3D image may be received from an image acquisition device, such as a C-arm image acquisition device, or may be a previously stored volume loaded from a computer readable medium, memory, or storage system of a computer.

At step 104, an LA chamber body is segmented from the 3D image. Segmentation of an LA chamber body includes detection of the LA chamber body within the 3D image. As discussed above, MSL provides an efficient and robust method for 3D anatomical structure detection within medical images. The overall segmentation of the LA chamber body using MSL can be performed in two stages: 1) anatomical structure localization; and 2) boundary delineation. MSL is more efficient than conventional approaches in learning discriminative object models useful for anatomical structure localization because MSL does not operate directly on a full parameter space and is well suited for 3D object detection. MSL provides for the incremental learning of classifiers within marginal spaces instead of learning classifiers directly in a full similarity transformation space. As the dimensionality of transformation space increases, the valid space region for object localization and detection is restricted by previous marginal space classifiers.

Figure 2:
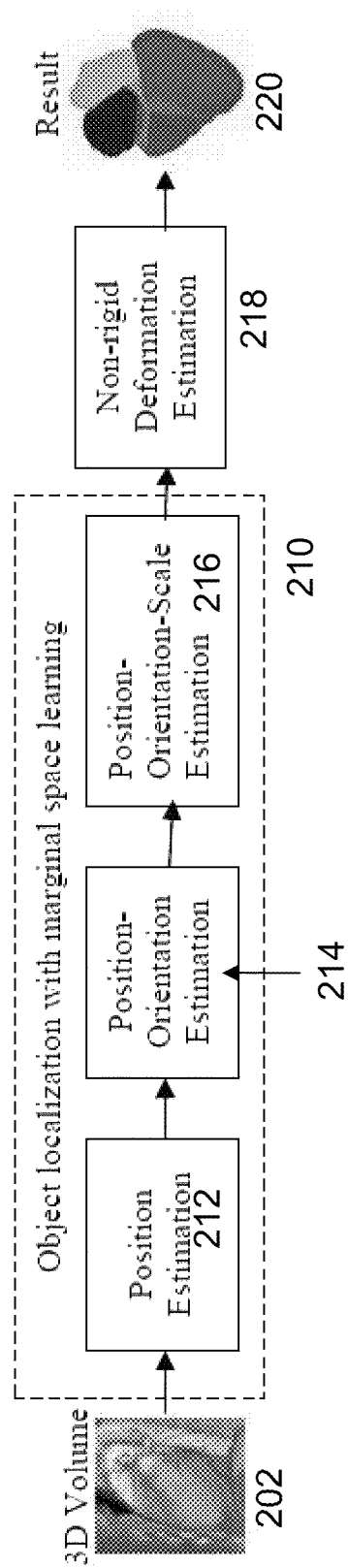
FIG. 2 illustrates a method for MSL based non-rigid object detection and segmentation according to an embodiment of the present invention.

FIG. 2 illustrates 3D object segmentation using MSL according to an embodiment of the present invention. For example, the method of FIG. 2 can be used to segment the LA chamber body (step 104 of FIG. 1). The 3D object segmentation in 3D volume 202 can be formulated in two stages: object localization using MSL (210) and boundary delineation (218). As illustrated in FIG. 2, object localization (210) or detection in an input 3D volume 202 is split into three steps: object position estimation 212, position-orientation estimation 214, and position-orientation-scale estimation 216. A separate classifier is trained based on annotated training data for each of these steps. In the position estimation step 212, a trained position classifier detects position candidates in the 3D image 202. In the position-orientation estimation step 214, a trained position-orientation classifier detects position-orientation candidates based on the detected position candidates. In the position-orientation-scale estimation step 216, a trained position-orientation-scale classifier detects position-orientation-scale candidates based on the detected position-orientation candidates Accordingly, the object localization stage 210 results in an estimated transformation (position, orientation, and scale) of the object, and a mean shape of the object is aligned with the 3D volume using the estimated transformation. Boundary delineation of the estimated object shape is then performed by non-rigid deformation estimation 218. The non-rigid deformation can be performed using a learning based boundary detector and active shape model (ASM). The resulting segmented object is shown by segmented object 220.

Figure 3:
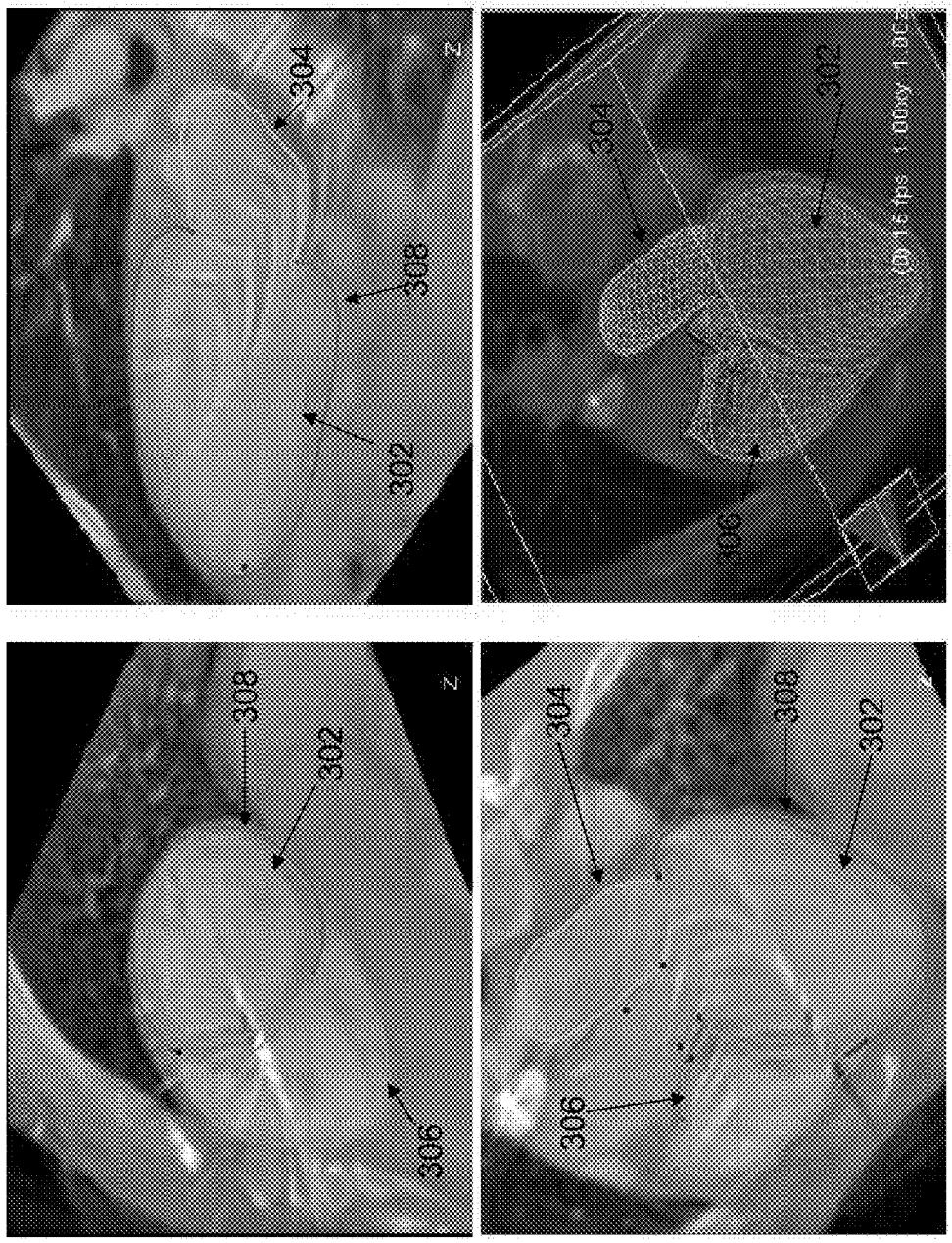
FIG. 3 illustrates an exemplary representation of the segmentation of other chambers of the heart according to an embodiment of the present invention.
Figure 4A:
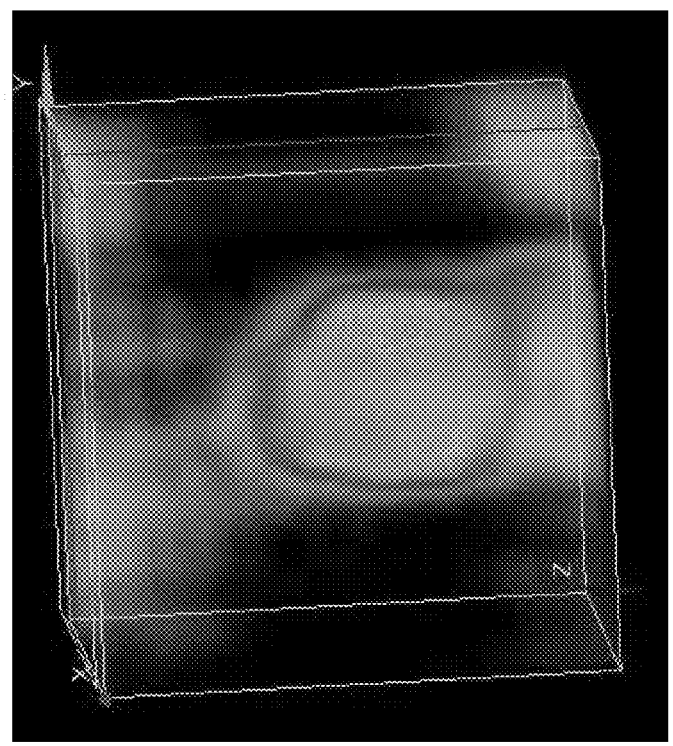
FIGS. 4a-4d illustrate probability maps for landmark detection of a pulmonary venous ostia at 16 mm, 8 mm, 4 mm, and 2 mm resolution, respectively, according to an embodiment of the present invention.
Figure 4B:
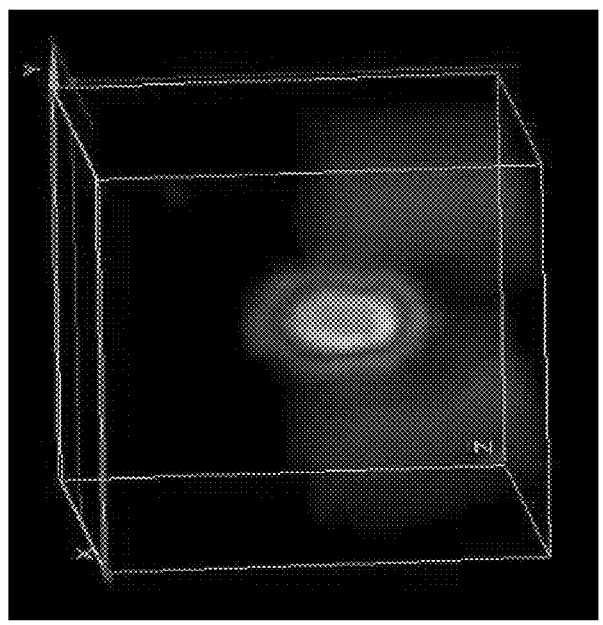
Figure 4C:
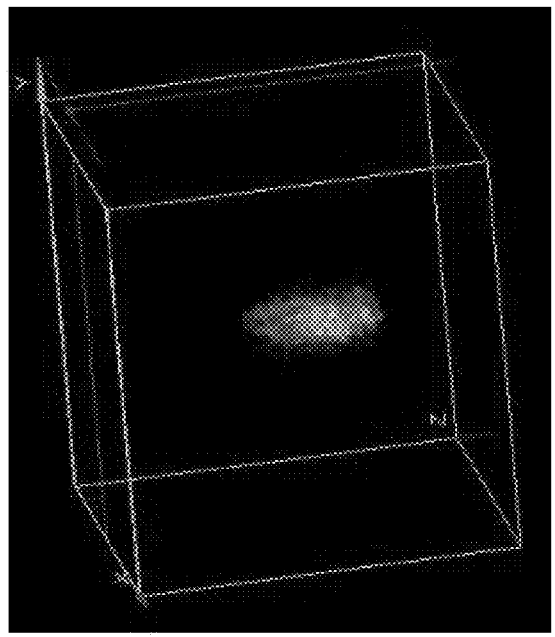
Figure 4D:
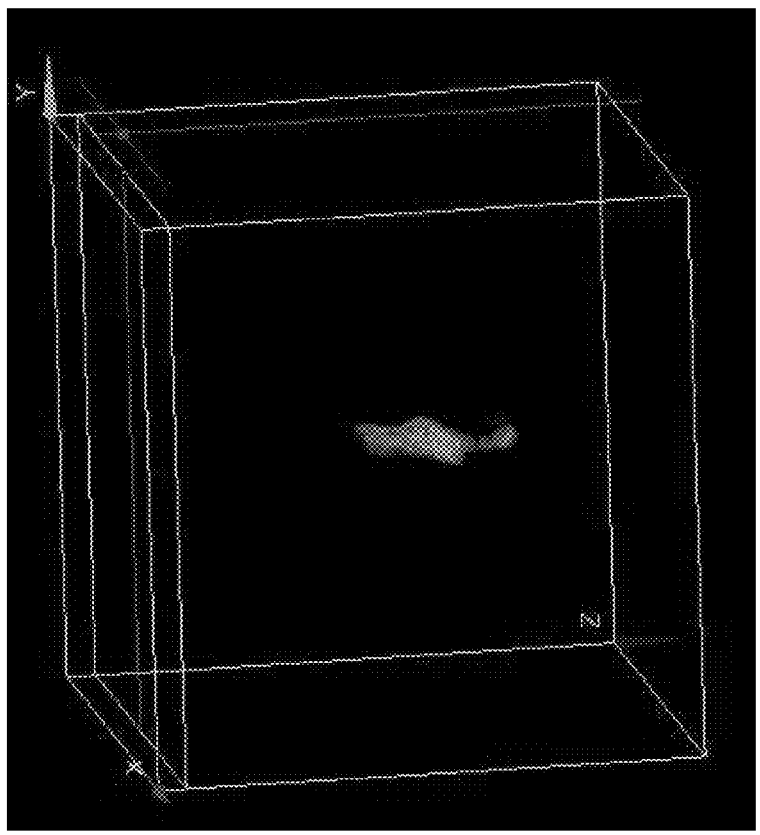

The present invention and the embodiments described herein are not limited to LA detection, but can be extended to detection of other chambers of the heart, including, but not limited to, the left ventricle (LV), right ventricle (RV), and right atrium (RA). FIG. 3 illustrates an exemplary representation of the segmentation results of the heart chamber. The left ventricle endocardial surface is represented by 302, and the left ventricle epicardial surface is represented by 308. The left atrium is represented by 304. The right ventricle is represented by 306. Although not shown, the right atrium may also be segmented and shown in a similar fashion as the other chambers.

Returning to FIG. 1, after segmentation of the LA is performed, at step 106, at least one pulmonary venous ostium is detected. Landmark detection based on multi-resolution probability maps can be performed in order to detect the pulmonary venous ostia. In one embodiment, four detectors at four different image resolutions are trained to detect the pulmonary venous ostia. For each detector and each training volume, a probability map is generated by analyzing the volume and recording a detector score at each voxel of the volume. Appropriate detection thresholds are determined from the probability maps of the training volumes. The trained detectors are used to detect pulmonary ostia on the surface of the LA chamber body in the received 3D image using a coarse-to-fine approach. Using this multi-resolution approach to increase the accuracy of the detection, a fusion detector fuses all probability maps, which may be at different resolutions, generated from the four trained detectors. The probability maps may be fused or merged by addition or multiplication. Addition of probability maps provides performance that is more robust against outliers, whereas multiplication provides performance that is more accurate for inliers. FIGS. 4a-4d illustrate probability maps for landmarks detected at 16 mm, 8 mm, 4 mm, and 2 mm resolution, respectively. After the pulmonary venous ostia have been detected, the configuration may be mapped against major drainage patterns.

Figure 5A:
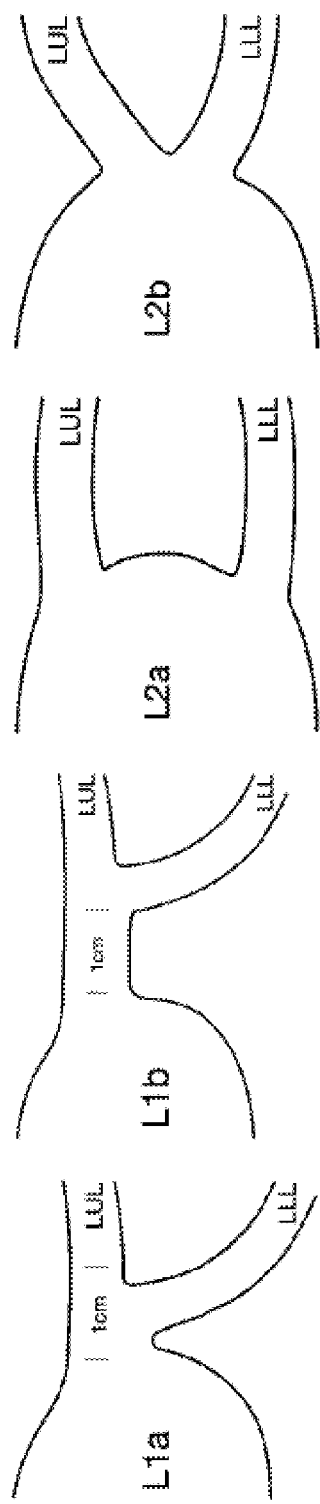
FIGS. 5a and 5b illustrate variations of pulmonary venous drainage patterns.
Figure 5B:
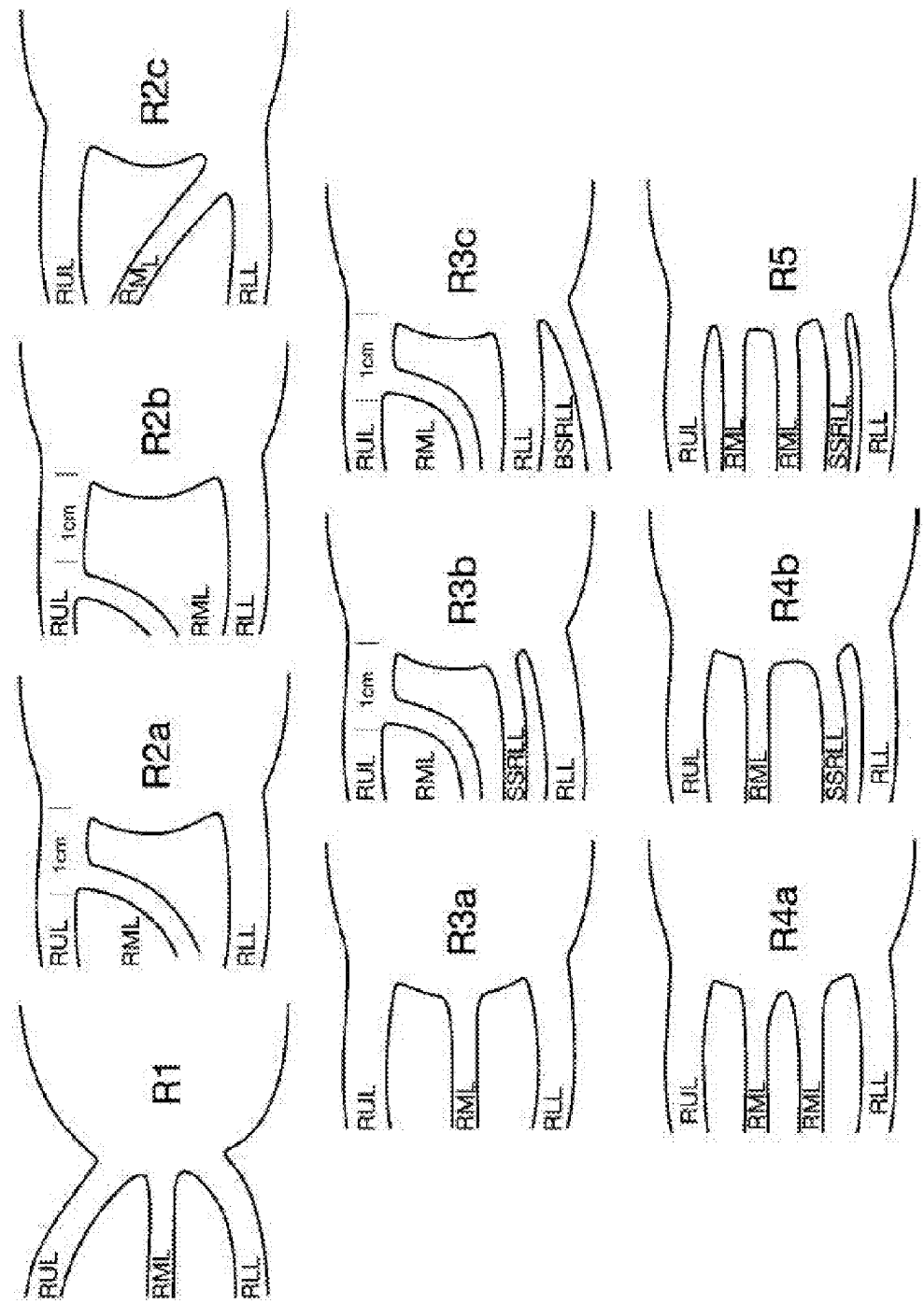

FIGS. 5a and 5b illustrate variations of pulmonary venous drainage patterns. FIG. 5a illustrates major drainage patterns for left pulmonary veins. FIG. 5b illustrates major drainage patterns for right pulmonary veins. The pulmonary venous ostia detected through step 106 may be automatically mapped to one of the major drainage patterns shown in FIGS. 5a and 5b in order to determine which particular drainage pattern a particular patient has.

Returning to FIG. 1, at step 108, at least one pulmonary vein trunk connected to the LA chamber body is segmented based on the detected pulmonary ostia. The center line of a vessel trunk connecting the segmented LA from each detected pulmonary venous ostia is traced. Multiple approaches exist for tracing the vessel trunk center line. A hybrid model-based and graph-based approach may be used, as discussed in greater detail in D. Fritz, et. al., "Interactive vessel-tracking with a hybrid model-based and graph-based approach," Proc. Of SPIE Medical Imaging, 2009, which is incorporated herein by reference. Additionally, a method of segmenting an aorta from a DynaCT volume, discussed in greater detail in United States Patent Application No. 2010/0239148 entitled "Method and System for Automatic Aorta Segmentation," which is incorporated herein by reference. A similar method can be applied to segment the lumen of a pulmonary vein because both the aorta and pulmonary vein are tubular structures. A tube around the center line with a fixed radius represents an initial estimate of the lumen of the pulmonary vein trunk. The radius is set to the mean radius of data from a training set. A learning based boundary detector is used to further refine the lumen. For example, a two-step iterative approach can be used to refine the lumen segmentation: 1) the learning based boundary is used to adjust each mesh point, or sample point within a volume, along the surface normal to an optimal position where the boundary detector response is the largest; and 2) generic mesh smoothing is performed. The two aforementioned steps may be repeated as many times as necessary to improve boundary delineation accuracy.

Figure 6A:
FIGS. 6a and 6b illustrate exemplary left atrium model segmentation results according to an embodiment of the present invention.
Figure 6B:
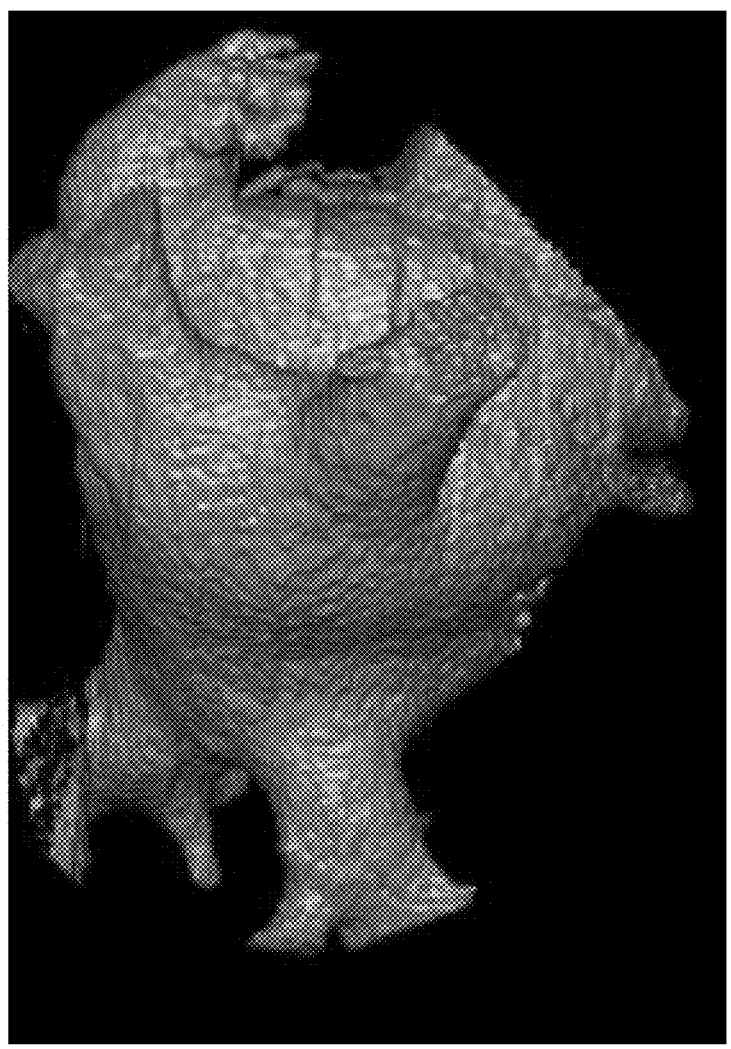

At step 110, a personalized LA model is extracted by fitting the segmented LA chamber body with the segmented pulmonary vein trunks. FIGS. 6a and 6b illustrate exemplary segmentation results of personalized LA models. FIG. 6a illustrates a case where an extra small right pulmonary vein 602 connecting directly to the LA exists. FIG. 6b illustrates a case where a small vein connects to the lower lobe pulmonary vein.

At step 112, an ablation strategy is generated based upon the personalized LA model. Different types of arrhythmia (e.g., persistent vs. paroxysmal AF) and other clinical parameters concerning a particular patient dictates which ablation strategy should be employed. One traditional approach is simple pulmonary vein isolation. This approach may be modified and enhanced with approaches that are more sophisticated.

Figure 7A:
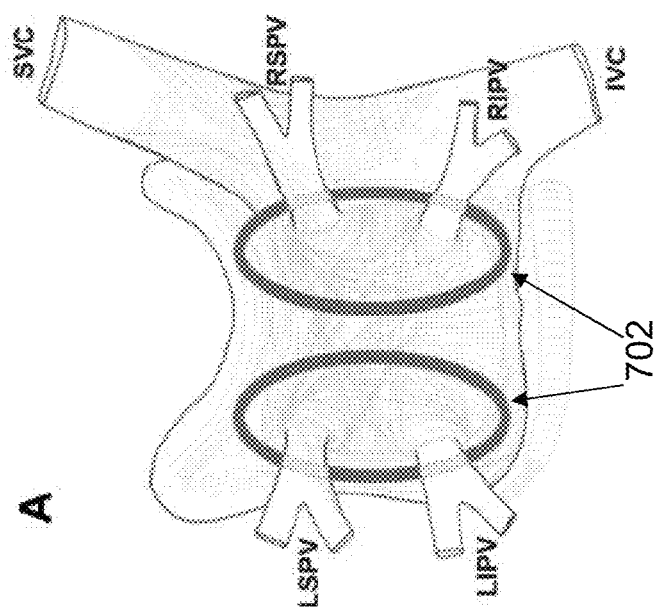
Figure 7B:
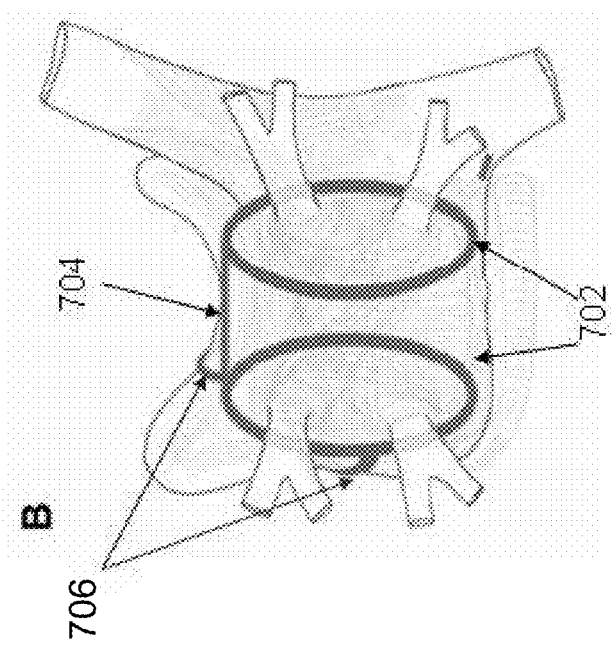
Figure 7D:
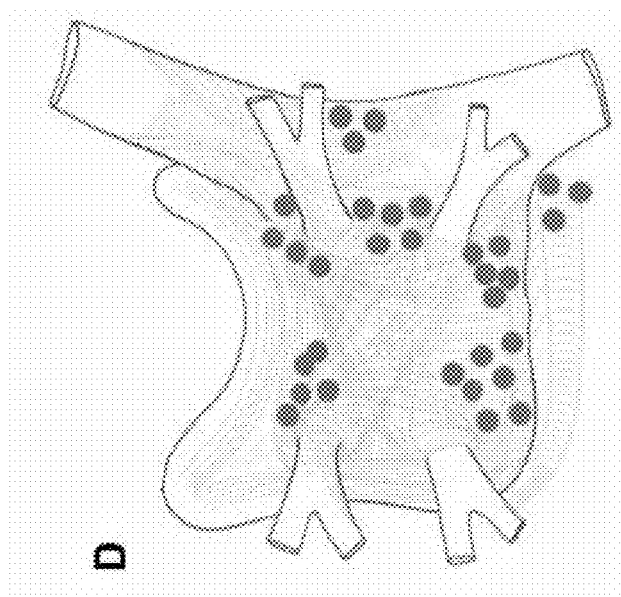

FIGS. 7a, 7b, and 7c illustrate some common ablation strategies. FIG. 7a illustrates circumferential ablation lesions 702, around the right and left pulmonary veins. FIG. 7b illustrates additional linear lesions with a roof line 704 connecting circumferential ablation lesions 702, and a mitral isthmus line 706. FIG. 7c illustrates additional linear lines 710 between the pulmonary veins. FIG. 7d illustrates an additional ablation strategy showing ablated isolated regions, instead of ablating along a line. This ablation strategy is useful for treating patients with complex fractioned atrial electrograms.

In one embodiment, a user may select a general ablation line pattern, such as, for example, a circumferential segmented ablation pattern. The pattern is then automatically translated and matched to an individual patient's anatomy. The automatically generated ablation patterns may be visualized in conjunction with the segmented 3D data. The segmented data with ablation patterns may be transferred to an electro-anatomical mapping system or navigation system in order to partially automate the procedure.

Figure 8A:
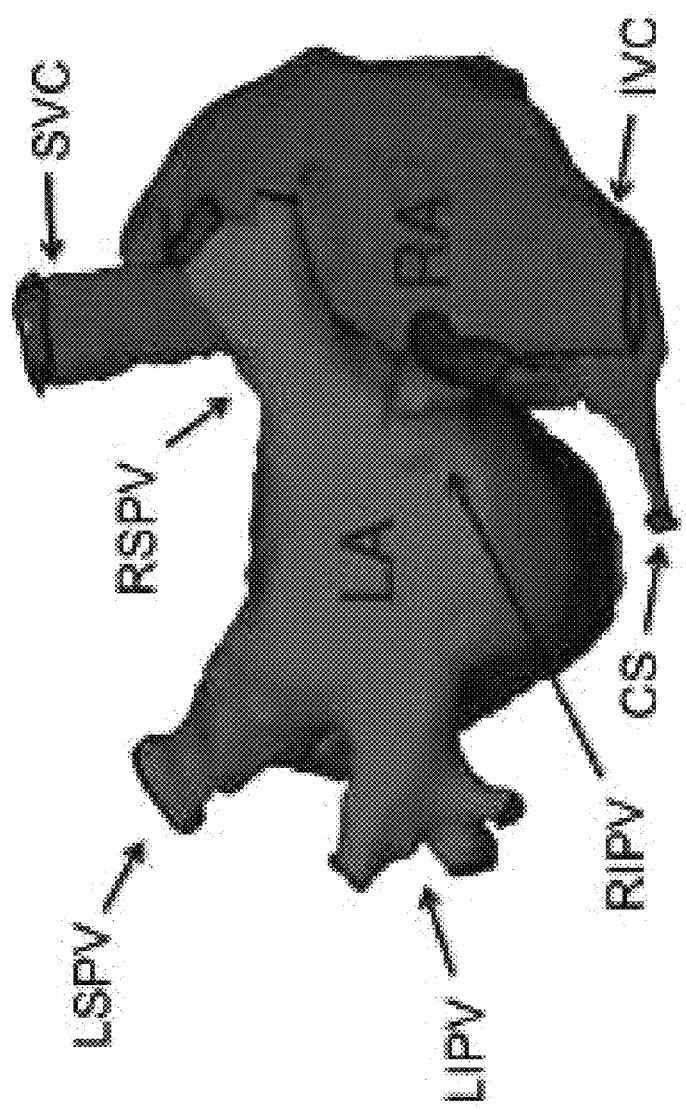
FIGS. 8a and 8b illustrate a segmented personalized left atrium model and exemplary ablation strategies according to an embodiment of the present invention.
Figure 8B:
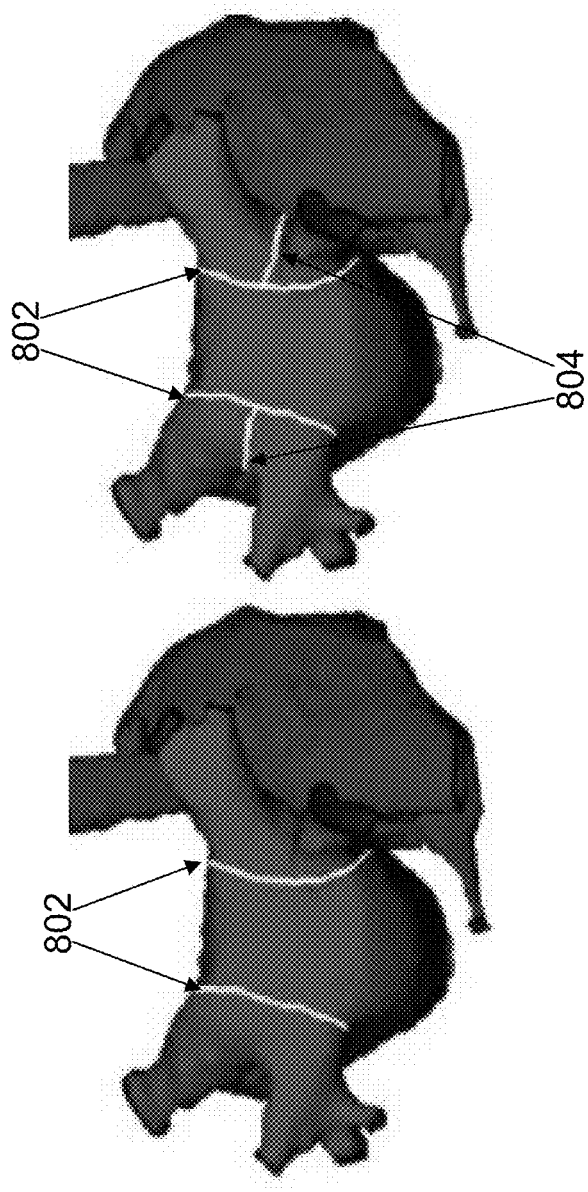

FIGS. 8a and 8b illustrate an exemplary ablation strategy mapped to a personalized left atrium model according to an embodiment of the present invention. FIG. 8a illustrates the segmented personalized LA described herein. FIG. 8b illustrates proposed ablation strategies for the segmented LA. Specifically, the suggested ablation lines 802 and 804 are automatically generated in response to a particular patient's anatomy.

Figure 9:
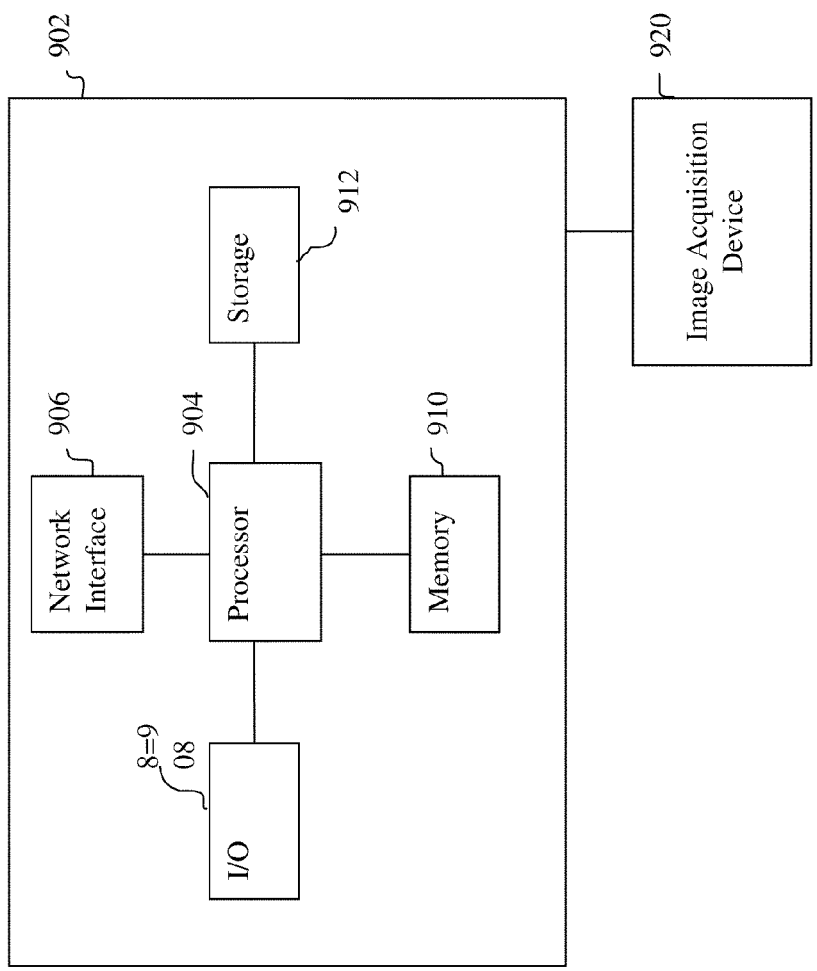
FIG. 9 is a high-level block diagram of a computer capable of implementing the embodiments of the present invention.

The above-described methods for personalized left atrium modeling may be implemented on a computer using well-known computer processors, memory units, storage devices, computer software, and other components. A high level block diagram of such a computer is illustrated in FIG. 9. Computer 902 contains a processor 904, which controls the overall operation of the computer 902 by executing computer program instructions, which define such operation. The computer program instructions may be stored in a storage device 912, or other computer readable medium, (e.g., magnetic disk) and loaded into memory 910 when execution of the computer program instructions is desired. Thus, all method steps described above, including the method steps illustrated in FIG. 1, may be defined by the computer program instructions stored in the memory 910 and/or storage 912 and controlled by the processor 904 executing the computer program instructions. An image acquisition device 920, such as an C-arm image acquisition device, can be connected to the computer 902 to input fluoroscopic image sequences to the computer 902. It is possible to implement the image acquisition device 920 and the computer 902 as one device. It is also possible that the image acquisition device 920 and the computer 902 communicate wirelessly through a network. The computer 902 also includes one or more network interfaces 906 for communicating with other devices via a network. The computer 902 also includes other input/output devices 908 that enable user interaction with the computer 902 (e.g., display, keyboard, mouse, speakers, buttons, etc.) One skilled in the art will recognize that an implementation of an actual computer could contain other components as well, and that FIG. 9 is a high level representation of some of the components of such a computer for illustrative purposes. In addition, computer 902 may also perform other functionalities, such as those described above in connection with FIGS. 2 through 8.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for extracting a personalized left atrium model from a 3D image volume, comprising:
    segmenting a left atrium chamber body in the 3D image volume;
    detecting at least one pulmonary venous ostia on the segmented left atrium chamber body using at least one trained detector; and
    segmenting at least one pulmonary vein trunk connected to the left atrium chamber body based on the detected pulmonary venous ostia.

2. The method of claim 1, further comprising:
    generating the personalized left atrium model by fitting the segmented at least one pulmonary vein trunk to the segmented left atrium chamber body.

3. The method of claim 1, wherein said step of segmenting a left atrium chamber body comprises:
    localizing the left atrium chamber body in the 3D volume using marginal space learning (MSL); and
    deforming a boundary of the left atrium chamber body using a learning based boundary detector.

4. The method of claim 3, wherein said step of localizing the left atrium chamber body comprises:
    estimating position candidates for the left atrium chamber body using a trained position detector;
    estimating position-orientation candidates for the left atrium chamber body based on the estimated position candidates using a trained position-orientation detector;
    estimating a full similarity transform of the left atrium chamber body based on the estimated position-orientation candidates using a trained position-orientation-scale detector; and
    determining an initial shape of the left atrium chamber body using the estimated full similarity transform.

5. The method of claim 3, wherein said step of deforming a boundary of the left atrium chamber body comprises:
    deforming the boundary of the localized left atrium chamber body using the learning based boundary detector and an active shape model.

6. The method of claim 1, wherein said step of detecting at least one pulmonary venous ostia comprises:
    generating probability maps of pulmonary venous ostia in the 3D image volume at a plurality of resolutions using a plurality of trained detectors;
    determining a configuration of the pulmonary venous ostia based on the probability maps; and
    mapping the configuration of the pulmonary venous ostia to a set of major pulmonary drainage patterns.

7. The method of claim 1, wherein said step of segmenting at least one pulmonary vein trunk comprises:
    determining a center line of the at least one pulmonary vein trunk from the detected at least one pulmonary ostia on the left atrium chamber body;
    defining a radius of the at least one pulmonary vein trunk; and
    refining a boundary of the at least one pulmonary vein trunk.

8. The method of claim 7, wherein said step of refining a boundary of the at least one pulmonary vein trunk comprises:
    adjusting mesh points on the at least one pulmonary vein trunk based on a learning based boundary detector; and
    smoothing the mesh points.

9. The method of claim 1, further comprising:
    automatically generating an ablation strategy based upon the extracted personalized left atrium model.

10. An apparatus for extraction of a personalized left atrium model from a 3D image volume, comprising:
    means for segmenting a left atrium chamber body in the 3D image volume;
    means for detecting a pulmonary venous ostia on the segmented left atrium chamber body using at least one trained detector;
    means for segmenting at least one pulmonary vein trunk connected to the left atrium chamber body based on the detected pulmonary venous ostia.

11. The apparatus of claim 10, further comprising:
    means for generating the personalized left atrium model by fitting the segmented at least one pulmonary vein trunk to the segmented left atrium chamber body.

12. The apparatus of claim 10, wherein said means for segmenting a left atrium chamber body comprises:
    means for localizing the left atrium chamber body in the 3D volume using marginal space learning (MSL); and
    means for deforming a boundary of the left atrium chamber body using a learning based boundary detector.

13. The apparatus of claim 12, wherein said means for localizing the left atrium chamber body comprises:
    means for estimating position candidates for the left atrium chamber body using a trained position detector;
    means for estimating position-orientation candidates for the left atrium chamber body based on the estimated position candidates using a trained position-orientation detector;
    means for estimating a full similarity transform of the left atrium chamber body based on the estimated position-orientation candidates using a trained position-orientation-scale detector; and
    means for determining an initial shape of the left atrium chamber body using the estimated full similarity transform.

14. The apparatus of claim 12, wherein said means for deforming a boundary of the left atrium chamber body comprises:
    means for deforming the boundary of the localized left atrium chamber body using the learning based boundary detector and an active shape model.

15. The apparatus of claim 10, wherein said means for detecting at least one pulmonary venous ostia comprises:
    means for generating probability maps of pulmonary venous ostia from the 3D image volume at a plurality of resolutions using a plurality of trained detectors;
    means for determining the configuration of the pulmonary venous ostia based on the probability maps; and
    means for mapping the configuration of the pulmonary venous ostia to a set of major pulmonary drainage patterns.

16. The apparatus of claim 10, wherein said means for segmenting at least one pulmonary vein trunk comprises:
    means for determining a center line of the at least one pulmonary vein trunk from the detected at least one pulmonary ostia on the left atrium chamber body;
    means for defining a radius of the at least one pulmonary vein trunk; and
    means for refining a boundary of the at least one pulmonary vein trunk.

17. The apparatus of claim 16, wherein said means for refining a boundary of the at least one pulmonary being trunk comprises:
    means for adjusting mesh points on the at least one pulmonary vein trunk based on a learning based boundary detector; and
    means for smoothing the mesh points.

18. The apparatus of claim 10, further comprising:
means for automatically generating an ablation strategy based upon the extracted personalized left atrium model.

19. A non-transitory computer readable medium encoded with computer executable instructions for extraction of a personalized left atrium model from a 3D image volume, the computer executable instructions defining steps comprising:
segmenting a left atrium chamber body in the 3D image volume;
detecting at least one pulmonary venous ostia on the segmented left atrium chamber body using at least one trained detector; and
segmenting at least one pulmonary vein trunk connected to the left atrium chamber body based on the detected pulmonary venous ostia.

20. The non-transitory computer readable medium of claim 19, the computer executable instructions further defining steps comprising:
generating the personalized left atrium model by fitting the segmented at least one pulmonary vein trunk to the segmented left atrium chamber body.

21. The non-transitory computer readable medium of claim 19, wherein the computer executable instructions defining the step of segmenting a left atrium chamber body comprises:
localizing the left atrium chamber body in the 3D volume using marginal space learning (MSL); and
deforming a boundary of the left atrium chamber body using a learning based boundary detector.

22. The non-transitory computer readable medium of claim 21, wherein the computer executable instructions defining the step of localizing the left atrium chamber body comprises:
estimating position candidates for the left atrium chamber body using a trained position detector;
estimating position-orientation candidates for the left atrium chamber body based on the estimated position candidates using a trained position-orientation detector;
estimating a full similarity transform of the left atrium chamber body based on the estimated position-orientation candidates using a trained position-orientation-scale detector; and
determining an initial shape of the left atrium chamber body using the estimated full similarity transform.

23. The non-transitory computer readable medium of claim 21, wherein the computer executable instructions defining the step of deforming a boundary of the left atrium chamber body comprises:
deforming the boundary of the localized left atrium chamber body using the learning based boundary detector and an active shape model.

24. The non-transitory computer readable medium of claim 19, wherein the computer executable instructions defining the step of detecting at least one pulmonary venous ostia comprises:
generating probability maps of pulmonary venous ostia in the 3D image volume at a plurality of resolutions using a plurality of trained detectors;
determining a configuration of the pulmonary venous ostia based on the probability maps; and
mapping the configuration of the pulmonary venous ostia to a set of major pulmonary drainage patterns.

25. The non-transitory computer readable medium of claim 19, wherein the computer executable instructions defining the step of segmenting at least one pulmonary vein trunk comprises:
determining a center line of the at least one pulmonary vein trunk from the detected at least one pulmonary ostia on the left atrium chamber body;
defining a radius of the at least one pulmonary vein trunk; and
refining a boundary of the at least one pulmonary vein trunk.

26. The non-transitory computer readable medium of claim 25, wherein the computer executable instructions defining the step of refining a boundary of the at least one pulmonary vein trunk comprises:
adjusting mesh points on the at least one pulmonary vein trunk based on a learning based boundary detector; and
smoothing the mesh points.

27. The non-transitory computer readable medium of claim 19, further comprising computer executable instructions defining the step of:
automatically generating an ablation strategy based upon the extracted personalized left atrium model.

* * * * *